United States Patent [19]

Trainor

[11] Patent Number: 4,832,450
[45] Date of Patent: May 23, 1989

[54] BAR LENS ASSEMBLY FOR REPRODUCTION MACHINE AND METHOD OF FORMING SAME

[75] Inventor: John Trainor, Vestal, N.Y.

[73] Assignee: Imagitek, Binghamton, N.Y.

[21] Appl. No.: 166,711

[22] Filed: Mar. 11, 1988

[51] Int. Cl.⁴ .......................... G02B 7/02; G03B 27/00
[52] U.S. Cl. .......................................... 350/252; 355/1
[58] Field of Search .............. 350/252, 254, 257, 96.1, 350/96.24, 320; 355/1, 8, 55, 67

[56] References Cited

U.S. PATENT DOCUMENTS

| 4,147,412 | 4/1979 | Kawamura et al. | 350/252 |
| 4,647,768 | 3/1987 | Ohta | 355/1 |
| 4,653,894 | 3/1987 | Pease | 355/1 |

Primary Examiner—Bruce Y. Arnold
Assistant Examiner—Loha Ben
Attorney, Agent, or Firm—Kane, Dalsimer, Sullivan, Kurucz, Levy, Eisele and Richard

[57] ABSTRACT

A bar lens assembly for a reproduction machine is provided. The assembly includes a stiffening member provided with a mounting pin to which a bar lens array is mounted. The lens array is precisely located with respect to the mounting pin. A method for assembling the bar lens assembly is also disclosed wherein locating bushing is positioned over a mounting pin of a lens array mounting place and the lens array is provided with an opening through which the locating pin passes. The lens array is affixed to the mounting plate and thereafter the locating bushing is removed. The lens array is thereby precisely positioned with respect to the mounting plate.

14 Claims, 1 Drawing Sheet

BAR LENS ASSEMBLY FOR REPRODUCTION MACHINE AND METHOD OF FORMING SAME

BACKGROUND OF THE INVENTION

The present invention relates to reproduction machines of the type that employ bar lens arrays and in particular to an improved lens assembly and method for assembling the lens to facilitate mounting while ensuring the critical optical alignment necessary for the machine.

Reproduction machines commonly employ for their optics bar lens arrays such as those which are sold by the Nippon Sheet Glass Company of Japan under the trademark SELFOC. For reasons which are discussed in some detail in U.S. Pat. Nos. 4,059,345 and 4,147,412 it is critical that the lens array be precisely located with respect to the image and optic planes of the reproduction machine. As a result, it heretofore has been common to precisely locate the center of the bar lens and pass a mounting pin through the center as shown for example, in U.S. Pat. No. 4,653,894. The mounting pin engages mounting openings in the reproduction machine and thus insures the proper alignment of the lens array during subsequent mounting and disassembly of the lens as is required for routine maintenance.

Since the mounting pins in such prior art assemblies are pressed into holes in the SELFOC bar lens, the lens must be precisely machined thus resulting in a relatively expensive component. Any misalignment of either the mounting pins in the bar lens resulted in components that would not operate properly. Further, the tight fit between the bar lens and the mounting pins can cause stresses in the lens which could result in damage to or destruction of the lens. This is an especially serious concern since any oversizing of the mounting pins with respect to the bar lens opening could cause damage to the delicate bar lens and, unless the mounting pins are precisely located with respect to the bar lens opening there can be no assurance that the lens array will seat in its optically proper position within the reproduction machine. Bar lenses are also easily damaged by bending which causes delamination of the assembly and dislocation and fracture of individual glass elements. This problem is particularly serious where long bar lenses are used.

SUMMARY OF THE INVENTION

In view of the above, it is the principal object of the present invention to provide an improved mounting arrangement for a bar lens assembly for a reproduction machine.

A further object is to provide such an arrangement which allows easy removal and subsequent reattachment of the bar lens in precise optical alignment.

A still further object is to provide such an arrangement which avoids the necessity of having a tightly fitting mounting member extending through the bar lens assembly.

A still further object is to provide such an arrangement which protects the bar lens from damage during handling and maintenance.

Still another object is to provide a mounting arrangement which avoids the necessity of dealing with precisely located bar lens openings and/or mounting pin locations while preserving the precise mounting locations of the complete lens assembly with respect to the reproduction machine.

The above and other beneficial objects and advantages are attained in accordance with the present invention by providing a stiffening plate with alignment pins for engagement with complementary mounting openings on an associated reproduction device. A bar lens array is precisely positioned and affixed onto the stiffening plate with respect to the mounting pins.

The bar lens assembly may be assembled with conventional jigs and dies to precisely locate the components. Alternatively the bar lens array may be provided with opening substantially oversized with respect to the alignment pins and in this configuration, the openings in the bar lens array are precisely positioned. The array is positioned over the stiffening plate with the alignment pins passing through the array openings. A hollow bushing having an inside diameter substantially equal to the diameter of the stiffening plate alignment pin and an outside diameter substantially equal to the diameter of the bar lens opening is positioned over each stiffening plate alignment pin passing through the bar lens openings. An adhesive is applied to the interface of the bar lens and the stiffening plate and permitted to set while the locating bushings are in position. The locating bushings are thereafter removed leaving the stiffening plate positioning pins cleanly passing through the lens openings with the lens array precisely located on the stiffening plate.

By properly dimensioning the locating pin and the location of its center bore, the lens array may be precisely located with respect to the stiffening plate positioning pins without necessarily precisely locating the mounting pins or the lens openings. The stiffening plate may be a separate piece or may comprise a structural component of the reproduction machine such as a light shield or the like.

DETAILED DESCRIPTION OF THE PREFERRED EMBODIMENT

Figure 1:
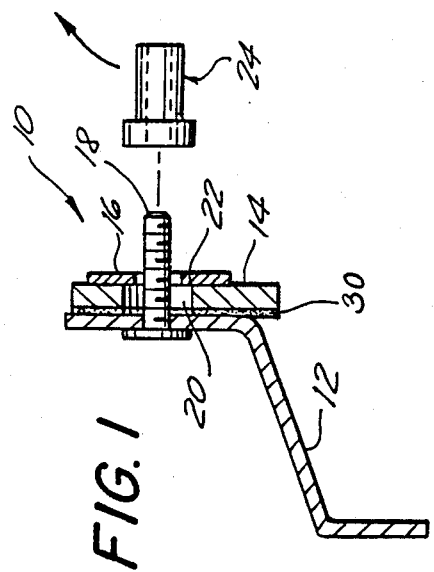
FIG. 1 is a side elevational sectional view of a lens bar array and associated stiffening plate assembled in accordance with the present invention; and, FIG. 2 is an exploded perspective view of the components of the array of FIG. 1 along with the positioning pin used in its assembly.

Reference is now made to the drawings and to FIG. 1 in particular wherein a bar lens assembly 10 for a reproduction machine (not shown) is depicted. The bar lens assembly 10 includes a relatively rigid stiffening plate 12 which may, for example, comprise a structural member of the machine, such as a light shield. The assembly 10 further includes a bar lens array 14 which is adhesively secured to the front face of the mounting plate 12; and a magnetic member 16 which is adhesively secured to the front face of the lens array. A mounting pin 18 affixed to the mounting plate 12 extends through an opening 20 in the lens array and an opening 22 in the magnetic member. The pin 18, along with at least one additional pin (not shown) serves to precisely locate the lens assembly with respect to the optical and image planes of the associated reproduction machine by engaging in precisely located openings located on the machine. The magnetic member serves to retain the assembly in position in a manner generally described in the previously mentioned U.S. Pat. No. 4,653,894. The mounting pin 18 may extend in the direction of the lens array as shown or in the opposite direction as determined by the geometry of the reproduction machine. It is critical, however, that the lens array be precisely located with respect to the mounting pins. This may be accomplished using jigs and the like to precisely locate the array or in the simplified manner described below.

Figure 2:
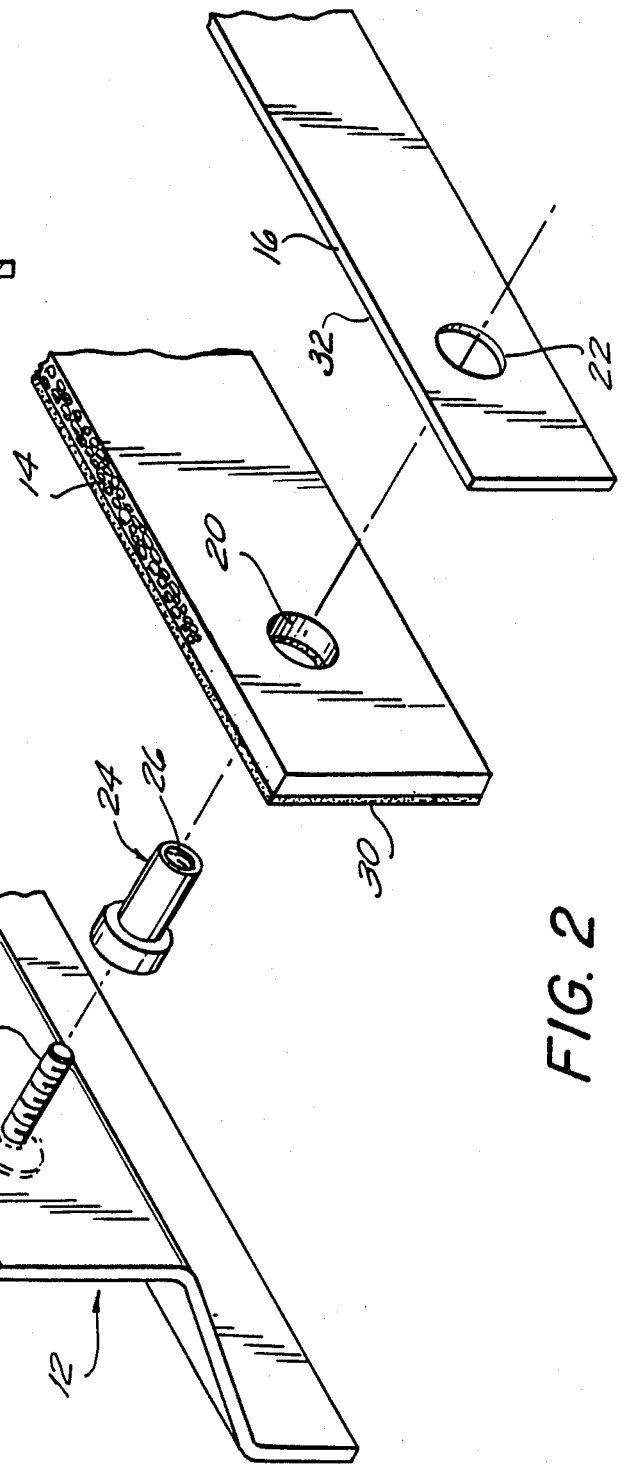

Reference is now made to FIG. 2 wherein the components of the lens assembly 10 are depicted in an exploded view. As shown, the diameter of the mounting pin 18 is substantially less than the openings 20 and 22 in the bar lens 14 and magnetic member 16, respectively. Accordingly, during assembly a temporary locating bushing 24 are is located over the mounting pin 18. The location of the internal bore 26 as well as the outside diameter of locating bushing 24 are such that when the locating bushing 24 is mounted over the plate mounting pin 18 and the bar lens array is mounted over the temporary locating bushing 24 the bar lens array is precisely positioned on the stiffening plate 12 so that when the mounting pins are then positioned in the associated mounting openings (not shown) of the reproduction machine the lens array will be precisely positioned between the image and optic axes of the reproduction machine.

To assemble the bar lens assembly 10 an appropriately dimensioned temporary locating bushing 24 is positioned over each of the mounting pins 18 of the stiffening plate 12. A bar lens array 14 provided with an adhesive backing 30 is then positioned over the temporary locating bushing and pressed against the stiffening plate 12. A magnetic member 16 with an adhesive backing 32 is then positioned over the temporary locating busing and pressed against the front of the bar lens array. When the adhesives 30,32 on the bar lens array set, the temporary locating bushing is then simply pulled off the mounting pin 18 leaving the bar lens array precisely located with respect to the mounting plate.

The temporary locating bushing 24 may be made of any easily machineable material. In addition, as distinct from the prior art which requires that the mounting pin be precisely located on the center of the bar lens elements of array 14 (as discussed, for example, in the previously mentioned U.S. Pat. No. 4,147,412) the mounting pins 18 of a bar lens assembly made in accordance with the present invention may be positioned at any convenient location by positioning the center bore 26 of the temporary locating bushing off center.

Thus in accordance with the above, the aforementioned objects are effectively attained. It should be appreciated that various modifications may be made to the described embodiment without departing from the scope of the present invention. Thus, it is not absolutely necessary that the magnetic member be secured to the bar lens while the temporary bushing is in position. The magnetic member may be secured to the bar lens array before or after the bar lens array is secured to the mounting plate. Similarly, the magnetic member may be affixed to the machine and a magnetically attractable material may be attached to the lens assembly or used as the stiffening member. Similarly, the alignment member(s) may be attached to the machine and positioning means may be provided via holes in the stiffening member. Similarly, the openings in the bar lens array may take on any convenient shape and need not be limited to round holes.

Having thus described the invention, what is claimed is:

1. A bar lens assembly for use in a reproduction machine comprising:
   an elongated rigid member;
   at least one alignment member extending from said rigid member;
   a bar lens array including at least one opening of a diameter greater than a diameter of said alignment member, said at least one alignment member loosely passing through said at least one opening; and
   a centering means engaging said at least one alignment member and said at least one opening thereby precisely positioning said bar lens array with respect to said at least one alignment member.

2. The invention in accordance with claim 1 wherein said alignment member comprises an elongated pin extending outwardly from said rigid member.

3. The invention in accordance with claim 2 further including a magnetic member affixed to said bar lens array.

4. The invention in accordance with claim 3 wherein said elongated pin extends through said magnetic member.

5. The invention in accordance with claim 1 wherein said elongated rigid member is of a magnetically attracted material and a magnet member is attached to a complementary member of said reproduction machine.

6. The invention in accordance with claim 1 wherein said alignment member comprises an elongated pin extending outwardly from a cooperative member affixed to said reproduction machine through cooperating holes located in said elongated rigid member.

7. The invention in accordance with claim 1 wherein said rigid member comprises a component of said reproduction machine.

8. An improved method for assembling bar lenses for use in reproduction machines comprising the steps of:
   providing a mounting plate with a mounting pin extending outwardly form at least one side thereof;
   positioning a temporary locating bushing over said mounting pin;
   positioning a bar lens array having an opening on said mounting plate with said temporary locating bushing passing through said opening;
   affixing said bar lens array to said mounting plate; and,
   thereafter removing said locating bushing.

9. The invention in accordance with claim 8 comprising the further step of providing an adhesive between said bar lens array and said rigid mounting plate and removing said locating bushing after said adhesive has set.

10. The invention in accordance with claim 8 wherein said locating bushing is provided with a central bore for receiving said mounting pin.

11. The invention in accordance with claim 8 wherein said locating bushing is provided with a noncentral bore for receiving said mounting pin.

12. The invention in accordance with claim 8 wherein said bar lens array opening is noncircular and said locating bushing has a corresponding noncircular outer periphery.

13. The invention in accordance with claim 8 comprising the further step of affixing a magnetic member to the face of said lens array opposite said mounting plate.

14. The invention in accordance with claim 13 wherein said magnetic member is provided with a through opening and comprising the further step of positioning said magnetic member over said bar lens array with said locating bushing also passing through said magnetic member through opening to affix said magnetic member to said bar lens array.

* * * * *